3,108,868
METHOD FOR PRODUCING SOIL-CONDITIONING COMPOSITIONS

Richard Wade, Bakersfield, Calif., assignor to United Soil Builders, a corporation of California
No Drawing. Filed Aug. 10, 1961, Ser. No. 130,497
12 Claims. (Cl. 71—21)

This invention relates to a method for preparing from the excrement of cows, microorganism-containing compositions having properties useful in agriculture and, more particularly, to a method for preparing compositions characterized by properties especially valuable in conditioning soil and promoting plant growth from the excrement of pregnant cows.

Animal excrement is known to contain constituents which are among those requisite for plant propagation. Since the excrement of animals are readily available and provide economical sources of plant food, these materials find widespread utilization in agriculture as fertilizers. The excrements generally preferred, however, are those which contain the highest percentages of nitrogen. Therefore, fecal excretions of pregnant cows which are characterized by relatively low nitrogen contents usually are considered to be relatively inferior as plant foods.

It has now been found that when fecal excrements of pregnant cows are treated according to the method of the invention described hereinafter, compositions can be obtained which are excellently adapted for use in agriculture.

Accordingly, it is the primary object of the invention to provide a method for treating the fecal excrements of pregnant cows whereby a composition characterized by valuable properties in agricultural production is obtained.

It is another object of the present invention to provide a method for treating the fecal excrements of pregnant cows to produce a composition which is suitable for utilization as a soil conditioner and plant food supplement.

It is an additional object of the present invention to provide a method for producing from the fecal excrements of pregnant cows a composition which when applied to soil significantly increases the water penetration and retention thereof.

It is a further object of the invention to provide a method for the treatment of the fecal excrements of pregnant cows wherein a composition is provided which can be utilized to promote the nutrient metabolism of plants.

Yet a further object of the present invention is a method for treating pregnant cow fecal excrements to produce a composition containing organic trace elements which promote desirable bacterial propagation in soil and stimulate plant growth.

It is a more particular object of the present invention to provide a method for treating the fecal excrements of pregnant cows wherein a microorganism-containing composition is produced which may be advantageously utilized as a synergistic aid in the assimilation of water and nutrients by plants.

Broadly described, the present invention provides a method for producing a composition having plant-growth promoting properties which comprises:

(a) mixing fecal excrement from pregnant cows with water to produce a mixture having an independent aqueous phase, (b) maintaining said mixture in a first digestion zone for a time period requisite to provide a supernatant fluid having a pH in the range of from about 5.8 to about 6.9, (c) removing a portion of said supernatant fluid from said first digestion zone, (d) diluting said supernatant fluid portion with from about 0.6 to about 1.4 parts by weight water per part by weight supernatant fluid, (e) maintaining said diluted supernatant fluid in a second digestion zone for a time period requisite to provide a concentrate fluid having a pH in the range of from about 6.2 to about 7.0, (f) removing a portion of said concentrate fluid from said second digestion zone, (g) diluting said portion of concentrate fluid with from about 20 to about 30 parts by weight water per part by weight concentrate fluid, and (h) allowing said diluted concentrate fluid to stand in a third digestion zone for a time period requisite to provide an aqueous, microorganism-containing composition having a pH greater than about 7.0.

The excrement contemplated for utilization in the method of the present invention is a collection of the fecal excrements of pregnant cows either alone or in admixture with other animal excrement. The essential constituent is the fecal excrement from pregnant cows, and collections of excretions of this type constitute the more preferred starting materials in the method of the invention. Although excrement which previously has been modified by physical means, such as by filtration and the like, suitably may be employed, unmodified collections of excretions are preferred.

In accordance with the method of the present invention the only microorganisms which are required to provide the desired plant-growth promoting compositions from suitable excrement mixtures are those specifically found in the fecal excretions of pregnant cows. Accordingly, valuable products adapted for utilization in agriculture can be prepared from the fecal excretions of pregnant cows without the use of microorganisms from other sources.

In the method of the invention the excrement, preferably an unfiltered collection of fecal excretions from pregnant cows, initially is mixed with water to provide a mixture having an independent aqueous phase. The particular amount of water which suitably may be employed will vary, but usually is in the range of from about 0.6 to about 1.4, preferably from about 0.8 to about 1.2, parts by weight per part by weight of the excrement collection.

The excrement-water mixture is then allowed to stand in a first digestion zone for a time period requisite to produce a supernatant fluid characterized by a pH in the range of from about 5.8 to about 6.9, preferably from about 6.2 to about 6.8. The particular time period which is involved will vary, depending inter alia, upon the temperature of the mixture, the composition of the excrement, the initial concentration of the mixture, and the desired final pH of the supernatant fluid. Preferably the temperature of the mixture is maintained in the range of from about 40 to about 90° F., and more preferably between about 60 and 90° F. At such temperatures the desired final pH of the supernatant fluid is obtained in a period of between about 5 and about 40 days with the higher temperatures effecting more rapid final pH attainment.

During the digestion of the excrement in the first digestion zone certain spent residues are formed and rise to the surface of the aqueous mixture. These residues preferably are removed periodically and discarded with a removal of these materials at daily intervals being satisfactory.

The digestion of excrement in the first digestion zone may be carried out as a batch or continuous process. In a batch-type process the incorporation of additional excrement into the digestion mixture may be required to achieve the desired supernatant fluid. When the digestion is desired to be carried out in a continuous manner, additional excrement periodically must be added to the digestion mixture. Preferably such additions of excrement are effected daily in increments approximating the amounts of spent excrement which are removed.

When the desired digestion of excrement has been effected in the first digestion zone, the supernatant fluid thereby obtained is removed therefrom to be diluted with water and sent to a second digestion zone. The removal of all of the supernatant fluid from the first digestion zone may be effected whereby a filtration thereof may be necessary. Alternatively, portions of the fluid periodically may be removed by withdrawing fluid from the digestion zone at a point which is intermediate the surface of the digestion mixture and the interface of the excrement solid phase and the independent aqueous phase of the digestion mixture.

A portion of the supernatant fluid obtained from the first digestion zone is then diluted with from about 0.6 to about 1.4, preferably from about 0.8 to about 1.2, parts by weight water per part by weight of the fluid, and the diluted fluid resulting thereby is passed to the second digestion zone. The diluted supernatant fluid is maintained in the second digestion zone for a time period requisite for a concentrate fluid to be obtained which is characterized by a pH in the range of from about 6.2 to about 7.0, preferably from about 6.5 to about 7.0.

The particular time period which the diluted supernatant liquid is maintained in the second digestion zone again will vary depending upon such factors as the characteristics of the supernatant fluid, the amount of water employed in the dilution of the supernatant fluid, and the desired pH of the concentrate fluid. Usually a time period in the range of between about 18 and 30 hours is satisfactory. When concentrate fluids are prepared by a method of the invention utilizing the preferred materials and conditions, recited hereinabove, the maintenance time in the second digestion zone preferably is in the range of from about 22 to about 26 hours.

In one embodiment of the method of the invention supplemental inorganic and/or organic compounds such as calcium carbonate, vitamins, and/or vitamin-containing substances are added to the liquid in the second digestion zone. Such materials may be employed to complement the activity of the active substances present in the concentrate fluid and/or the plant-growth promoting compositions ultimately obtained in the process of the invention.

Concentrate fluid obtained in the second digestion zone is then removed therefrom, diluted with additional water, and passed to a third digestion zone. The amount of water employed in the dilution of the concentrate fluid is in the range of from about 20 to about 30, preferably from about 24 to about 26, parts by weight per part by weight concentrate fluid. In view of the large amount of water involved in the dilution step of the process it is preferable when the process is carried out on a sizeable scale to divide the concentrate fluid into several portions prior to dilution.

The diluted concentrate fluid is maintained in the third digestion zone for a time period requisite for the production of microorganism-containing composition having a pH of at least about 7.0, preferably from about 7.0 to about 8.2. The time period usually required is at least about 50 hours, and preferably at least about 65 hours.

The microorganism-containing compositions produced in accordance with the method of the invention are characterized by properties which are particularly useful in agricultural production. These compositions are especially valuable in conditioning soil and promoting plant growth. One manner in which these microorganism-containing compositions may be employed is to incorporate them into irrigation water at such a rate that they are dispersed on the soil at the equivalent of about 30 gallons per acre with each regular irrigation. Alternatively, the aqueous compositions produced in accordance with the method of the invention may be sprayed directly onto the land at a rate equivalent to about 30 gallons per acre. In addition, it will be apparent to those skilled in the art that the compositions may be employed in combinations with other materials which are applied to the soil such as fertilizers and the like.

The invention having been generally described, the following examples are given to illustrate embodiments of the method of the invention. The examples are given for illustration purposes only and are not intended in any way to limit the scope of the invention.

*Example I*

One hundred parts by weight of a collection of unfiltered fecal excrements from pregnant cows were placed in a suitable vessel and diluted with about 100 parts by weight of fresh water. The aqueous mixture was maintained at temperatures ranging between about 40° and about 60° F. and allowed to stand for about 30 days. During this period residues which formed in the mixture and floated to the surface thereof were removed daily and discarded. Fresh excrement was added daily to the mixture in amounts approximating the amounts of residue removed. At the end of about 30 days a supernatant fluid having a pH of about 6.5 was formed from the mixture.

About 50 parts by weight of the supernatant fluid thereby obtained were then drawn from the first vessel, placed into a second vessel, and diluted with about 50 parts by weight of fresh water. The resulting diluted supernatant fluid was allowed to stand in the vessel for about 24 hours after which time a concentrate fluid was provided which had a pH of about 6.8.

About 4 parts by weight of the concentrate fluid were then placed in a third vessel, diluted with about 100 parts by weight of fresh water, and the resulting mixture was allowed to stand for about 72 hours. After this period a microorganism-containing composition was obtained which was characterized by a pH of about 7.5, and which demonstrated soil-conditioning and plant-growth promoting properties.

*Example II*

The procedure of Example I was repeated with the exception that the temperature of the water-excrement mixture was maintained between about 60° and about 90° F. instead of between about 40° and about 60° F. At the end of about 7 days a supernatant fluid having a pH of about 6.6 was formed from the excrement-containing mixture. The final microorganism-containing composition obtained was characterized by a pH of about 7.8 and was found to be excellent in conditioning soil and stimulating plant growth.

Since modifications of the described embodiments which do not depart from the scope of the invention will suggest themselves to those skilled in the art, it is intended that the invention be limited only by the scope of the appended claims.

I claim:

1. A method for producing a concentrate fluid useful in the preparation of a composition having plant growth promoting properties which comprises:
   (a) mixing fecal excrement from pregnant cows with water to produce a mixture having an independent aqueous phase,
   (b) maintaining said mixture in a first digestion zone for a time period requisite to provide a supernatant fluid having a pH in the range of from about 5.8 to about 6.9, (c) removing a portion of said supernatant fluid from said first digestion zone,
(d) diluting said supernatant fluid portion with from about 0.6 to about 1.4 parts by weight water per part by weight supernatant fluid, and
(e) maintaining said diluted supernatant fluid in a second digestion zone for a time period requisite to provide a concentrate fluid having a pH in the range of from about 6.2 to about 7.0.

2. The method for producing a composition having plant-growth promoting properties which comprises:
(a) mixing fecal excrement from pregnant cows with water to produce a mixture having an independent aqueous phase,
(b) maintaining said mixture in a first digestion zone for a time period requisite to provide a supernatant fluid having a pH in the range of from about 5.8 to about 6.9,
(c) removing a portion of said supernatant fluid from said first digestion zone,
(d) diluting said supernatant fluid portion with from about 0.6 to about 1.4 parts by weight water per part by weight supernatant fluid,
(e) maintaining said diluted supernatant fluid in a second digestion zone for a time period requisite to provide a concentrate fluid having a pH in the range of from about 6.2 to about 7.0,
(f) removing a portion of said concentrate fluid from said second digestion zone,
(g) diluting said portion of concentrate fluid with from about 20 to about 30 parts by weight water per part by weight concentrate fluid, and
(h) allowing said diluted concentrate fluid to stand in a third digestion zone for a time period requisite to provide an aqueous, microorganism-containing composition having a pH greater than about 7.0.

3. The method for producing a composition having plant-growth promoting properties according to claim 2 wherein additional excrement is introduced incrementally into the mixture in said first digestion zone during the digestion of said mixture.

4. The method for producing a composition having plant-growth promoting properties according to claim 2 wherein the mixture in said first digestion zone is maintained at a temperature in the range of from about 40° to about 90° F. during the digestion of said mixture.

5. The method for producing a composition having plant-growth promoting properties according to claim 2 wherein the amount of dilution water employed in said first digestion zone is in the range of from about 0.8 to about 1.2 parts by weight per part by weight said excrement, the amount of dilution water employed in said second digestion zone is in the range of from 0.8 to about 1.2 parts by weight per part by weight said supernatant fluid, and the amount of dilution water employed in said third digestion zone is in the range of from about 24 to about 26 parts by weight per part by weight said concentrate fluid.

6. The method for producing a composition having plant-growth promoting properties according to claim 2 wherein said supernatant fluid has a pH in the range of from about 6.2 to about 6.8, said concentrate fluid has a pH in the range of from about 6.5 to about 7.0, and said microorganism-containing composition has a pH in the range of from about 7.0 to about 8.2.

7. The method of producing a composition having a plant-growth promoting properties according to claim 2 wherein said excrement-containing mixture is maintained in said first digestion zone for a time period in the range of from 5 to about 40 days, said supernatant fluid is maintained in said second digestion zone for a time period in the range of from about 18 to about 30 hours, and said concentrate fluid is maintained in said third digestion zone for a time period of at least about 50 hours.

8. The method for producing a composition having plant-growth promoting properties according to claim 2 wherein calcium carbonate is added to the liquid in said second digestion zone.

9. The method for producing a composition having plant-growth promoting properties according to claim 2 wherein vitamins are added to the liquid in said second digestion zone.

10. A microorganism-containing composition having soil-conditioning and plant growth promoting properties produced by
(a) mixing fecal excrement from pregnant cows with water to produce a mixture having an independent aqueous phase,
(b) maintaining said mixture in a first digestion zone for a time period requisite to provide a supernatant fluid having a pH in the range of from about 5.8 to about 6.9,
(c) removing a portion of said supernatant fluid from said first digestion zone,
(d) diluting said supernatant fluid portion with from about 0.6 to about 1.4 parts by weight water per part by weight supernatant fluid,
(e) maintaining said diluted supernatant fluid in a second digestion zone for a time period requisite to provide a concentrate fluid having a pH in the range of from about 6.2 to about 7.0,
(f) removing a portion of said concentrate fluid from said second digestion zone,
(g) diluting said portion of concentrate fluid with from about 20 to about 30 parts by weight water per part by weight concentrate fluid, and
(h) allowing said diluted concentrate fluid to stand in a third digestion zone for a time period requisite to provide an aqueous, microorganism-containing composition having a pH greater than about 7.0.

11. A method which comprises supplying to soil a soil-conditioning agent produced by
(a) mixing fecal excrement from pregnant cows with water to produce a mixture having an independent aqueous phase,
(b) maintaining said mixture in a first digestion zone for a time period requisite to provide a supernatant fluid having a pH in the range of from about 5.8 to about 6.9,
(c) removing a portion of said supernatant fluid from said first digestion zone,
(d) diluting said supernatant fluid portion with from about 0.6 to about 1.4 parts by weight water per part by weight supernatant fluid,
(e) maintaining said diluted supernatant fluid in a second digestion zone for a time period requisite to provide a concentrate fluid having a pH in the range of from about 6.2 to about 7.0,
(f) removing a portion of said concentrate fluid from said second digestion zone,
(g) diluting said portion of concentrate fluid with from about 20 to about 30 parts by weight water per part by weight concentrate fluid, and
(h) allowing said diluted concentrate fluid to stand in a third digestion zone for a time period requisite to provide an aqueous, microorganism-containing composition having a pH greater than about 7.0.

12. A plant food possessing soil-conditioning and plant growth promoting properties comprising a mixture of a plant fertilizer and the microorganism-containing composition produced by
(a) mixing fecal excrement from pregnant cows with water to produce a mixture having an independent aqueous phase,
(b) maintaining said mixture in a first digestion zone for a time period requisite to provide a supernatant fluid having a pH in the range of from about 5.8 to about 6.9, (c) removing a portion of said supernatant fluid from said first digestion zone,
(d) diluting said supernatant fluid portion with from about 0.6 to about 1.4 parts by weight water per part by weight supernatant fluid,
(e) maintaining said diluted supernatant fluid in a second digestion zone for a time period requisite to provide a concentrate fluid having a pH in the range of from about 6.2 to about 7.0,
(f) removing a portion of said concentrate fluid from said second digestion zone,
(g) diluting said portion of concentrate fluid with from about 20 to about 30 parts by weight water per part by weight concentrate fluid, and
(h) allowing said diluted concentrate fluid to stand in a third digestion zone for a time period requisite to provide an aqueous, microorganism-containing composition having a pH greater than about 7.0.

References Cited in the file of this patent

UNITED STATES PATENTS

| | | |
|---|---|---|
| 160,191 | Hoffmann | Feb. 23, 1875 |
| 646,716 | Terne | Apr. 3, 1900 |
| 1,422,434 | Gardan | July 11, 1922 |
| 2,908,113 | Martin | Oct. 13, 1959 |